(12) United States Patent
Yi

(10) Patent No.: US 11,251,924 B2
(45) Date of Patent: Feb. 15, 2022

(54) METHOD AND APPARATUS FOR DESIGNING ACK/NACK CHANNEL IN WIRELESS COMMUNICATION SYSTEM

(71) Applicant: LG Electronics Inc., Seoul (KR)

(72) Inventor: Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 16/631,764

(22) PCT Filed: Jul. 25, 2018

(86) PCT No.: PCT/KR2018/008386
§ 371 (c)(1),
(2) Date: Jan. 16, 2020

(87) PCT Pub. No.: WO2019/022489
PCT Pub. Date: Jan. 31, 2019

(65) Prior Publication Data
US 2020/0136784 A1 Apr. 30, 2020

Related U.S. Application Data

(60) Provisional application No. 62/536,948, filed on Jul. 25, 2017.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04L 1/1861* (2013.01);
(Continued)

(58) Field of Classification Search
CPC ... H04L 5/0055; H04L 1/1812; H04L 1/1861; H04L 5/001; H04L 27/2607; H04W 72/0413; H04W 72/042; H04J 13/0062
See application file for complete search history.

(56) References Cited

U.S. PATENT DOCUMENTS 9,839,023 B2 * 12/2017 Seo ...................... H04W 72/042
10,568,086 B2 * 2/2020 Hwang ................. H04L 5/0082
(Continued)

FOREIGN PATENT DOCUMENTS

WO WO2013141594 9/2013

*Primary Examiner* — Michael J Moore, Jr.
(74) *Attorney, Agent, or Firm* — Fish & Richardson P.C.

(57) ABSTRACT

A method and apparatus for transmitting an acknowledgement/non-acknowledgement (ACK/NACK) in a wireless communication system is provided. According to the present invention, an ACK/NACK channel, like a physical HARQ indicator channel (PHICH) in long-term evolution (LTE), is designed in a new radio access technology (NR) system. Specifically, a base station (BS) receives uplink (UL) data from a UE, maps a resource for an ACK/NACK channel, which is used to transmit the ACK/NACK as a response to the UL data, to at least one control channel element (CCE) or at least one resource element group (REG), and transmits the ACK/NACK to the UE. The ACK/NACK channel is multiplexed with a physical downlink control channel (PDCCH) in the at least one CCE or the at least one REG.

12 Claims, 11 Drawing Sheets

(51) Int. Cl.
*H04W 72/04* (2009.01)
*H04J 13/00* (2011.01)
*H04L 27/26* (2006.01)

(52) U.S. Cl.
CPC ........... *H04L 5/001* (2013.01); *H04W 72/042* (2013.01); *H04W 72/0413* (2013.01); *H04J 13/0062* (2013.01); *H04L 27/2607* (2013.01)

(56) References Cited

U.S. PATENT DOCUMENTS

| | | | | |
|---|---|---|---|---|
| 10,959,219 | B2* | 3/2021 | Jo | H04L 5/0053 |
| 2008/0311942 | A1* | 12/2008 | Kim | H04L 1/1854 |
| | | | | 455/509 |
| 2011/0268059 | A1* | 11/2011 | Li | H04J 11/00 |
| | | | | 370/329 |
| 2012/0044871 | A1* | 2/2012 | Li | H04L 5/0053 |
| | | | | 370/328 |
| 2012/0113876 | A1* | 5/2012 | Li | H04L 1/1861 |
| | | | | 370/280 |
| 2012/0281576 | A1 | 11/2012 | Yamada et al. | |
| 2013/0182619 | A1* | 7/2013 | Tiirola | H04L 5/0055 |
| | | | | 370/280 |
| 2014/0146776 | A1* | 5/2014 | Li | H04L 5/0053 |
| | | | | 370/329 |
| 2015/0304082 | A1* | 10/2015 | Park | H04L 5/0048 |
| | | | | 370/329 |
| 2016/0050059 | A1* | 2/2016 | Guan | H04W 76/27 |
| | | | | 370/330 |
| 2016/0088605 | A1* | 3/2016 | Guan | H04L 1/1861 |
| | | | | 370/335 |
| 2018/0270807 | A1* | 9/2018 | Salem | H04L 5/0048 |
| 2019/0045527 | A1* | 2/2019 | Shimezawa | H04W 72/1263 |
| 2019/0306840 | A1* | 10/2019 | Taherzadeh Boroujeni | |
| | | | | H04W 72/042 |

* cited by examiner

METHOD AND APPARATUS FOR DESIGNING ACK/NACK CHANNEL IN WIRELESS COMMUNICATION SYSTEM

CROSS-REFERENCE TO RELATED APPLICATIONS

This application is a National Stage application under 35 U.S.C. § 371 of International Application No. PCT/KR2018/008386, filed on Jul. 25, 2018, which claims the benefit of U.S. Provisional Application No. 62/536,948 filed on Jul. 25, 2017. The disclosures of the prior applications are incorporated by reference in their entirety.

TECHNICAL FIELD

The present invention relates to wireless communications, and more particularly, to a method and apparatus for designing an acknowledgement/non-acknowledgement (ACK/NACK) channel in a new radio access technology (NR) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

To indicate status of the received transmission, a hybrid automatic repeat request (HARQ)-acknowledgement (ACK) can be transmitted by the receiver. In LTE/LTE-advanced (LTE-A), a physical HARQ indicator channel (PHICH) has been used to carry HARQ-ACK in response to uplink (UL) transmissions.

SUMMARY

In NR, a specific channel to carry the HARQ-ACK, like the PHICH in LTE/LTE-A, has not been designed for various reasons. However, in order to support low latency user equipment (UEs), it may be considered that a set of resources are configured in the network which are shared among multiple UEs for carrying the HARQ-ACK.

In an aspect, a method for transmitting an acknowledgement/non-acknowledgement (ACK/NACK) by a base station (BS) in a wireless communication system is provided. The method includes receiving uplink (UL) data from a UE, mapping a resource for an ACK/NACK channel, which is used to transmit the ACK/NACK as a response to the UL data, to at least one control channel element (CCE) or at least one resource element group (REG), and transmitting the ACK/NACK to the UE. The ACK/NACK channel is multiplexed with a physical downlink control channel (PDCCH) in the at least one CCE or the at least one REG.

In another aspect, a base station (BS) in a wireless communication system is provided. The BS includes a memory, a transceiver, a processor, operably coupled to the memory and the transceiver, that controls the transceiver to receive uplink (UL) data from a UE, maps a resource for an acknowledgement/non-acknowledgement (ACK/NACK) channel, which is used to transmit the ACK/NACK as a response to the UL data, to at least one control channel element (CCE) or at least one resource element group (REG), and controls the transceiver to transmit the ACK/NACK to the UE. The ACK/NACK channel is multiplexed with a physical downlink control channel (PDCCH) in the at least one CCE or the at least one REG.

HARQ-ACK for UEs supporting low latency, e.g. URLLC UEs, can be transmitted efficiently.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems.

The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
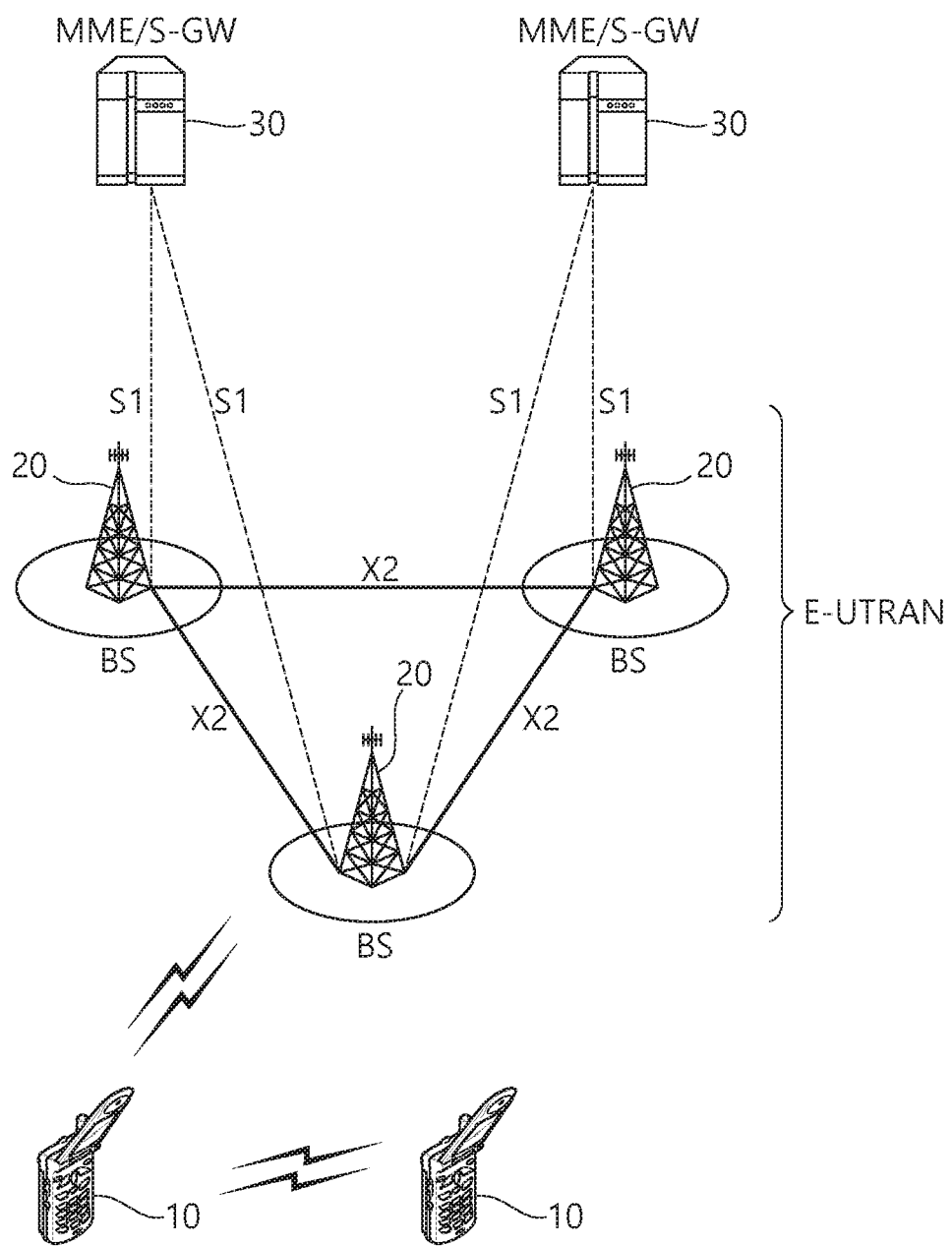
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
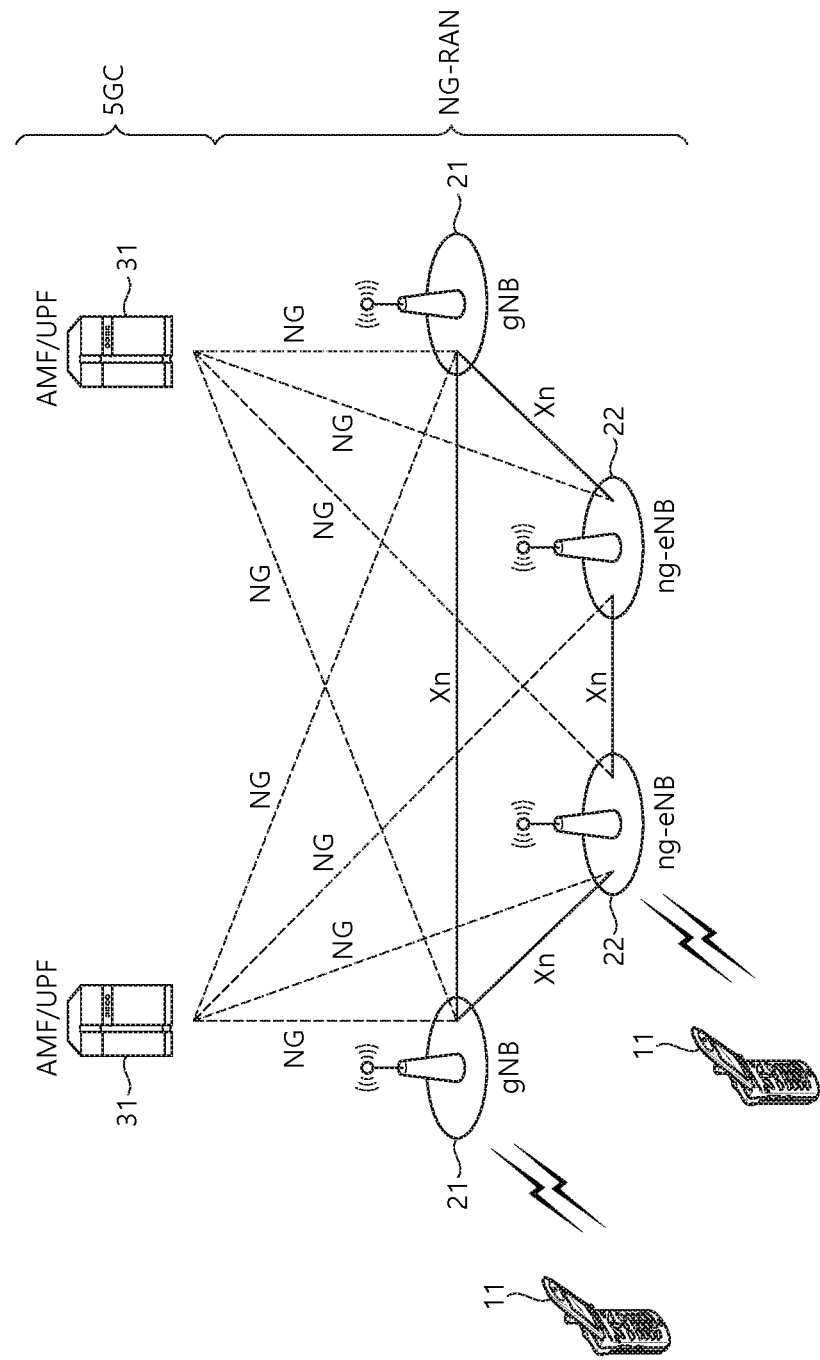
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index µ.

TABLE 1

| µ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index µ. However, subcarrier spacings shown in Table 1 are merely exemplary, and specific subcarrier spacings may be changed. Therefore, each subcarrier spacing (e.g. µ=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| µ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to µ=0 is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbols in the present specification may refer to an OFDM/OFDMA symbol, or SC-FDMA symbol, etc. A CP may be located between each symbol.

Figure 3:
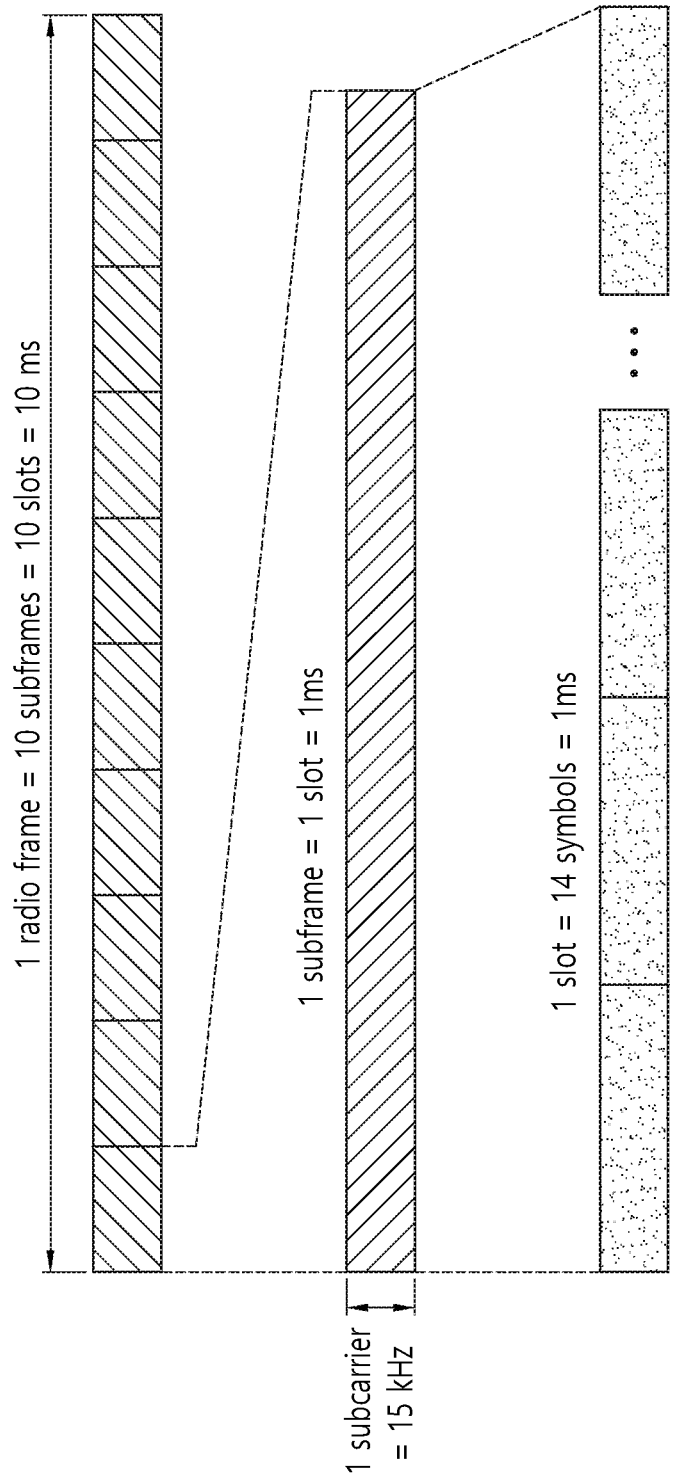
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to µ=0.

Figure 4:
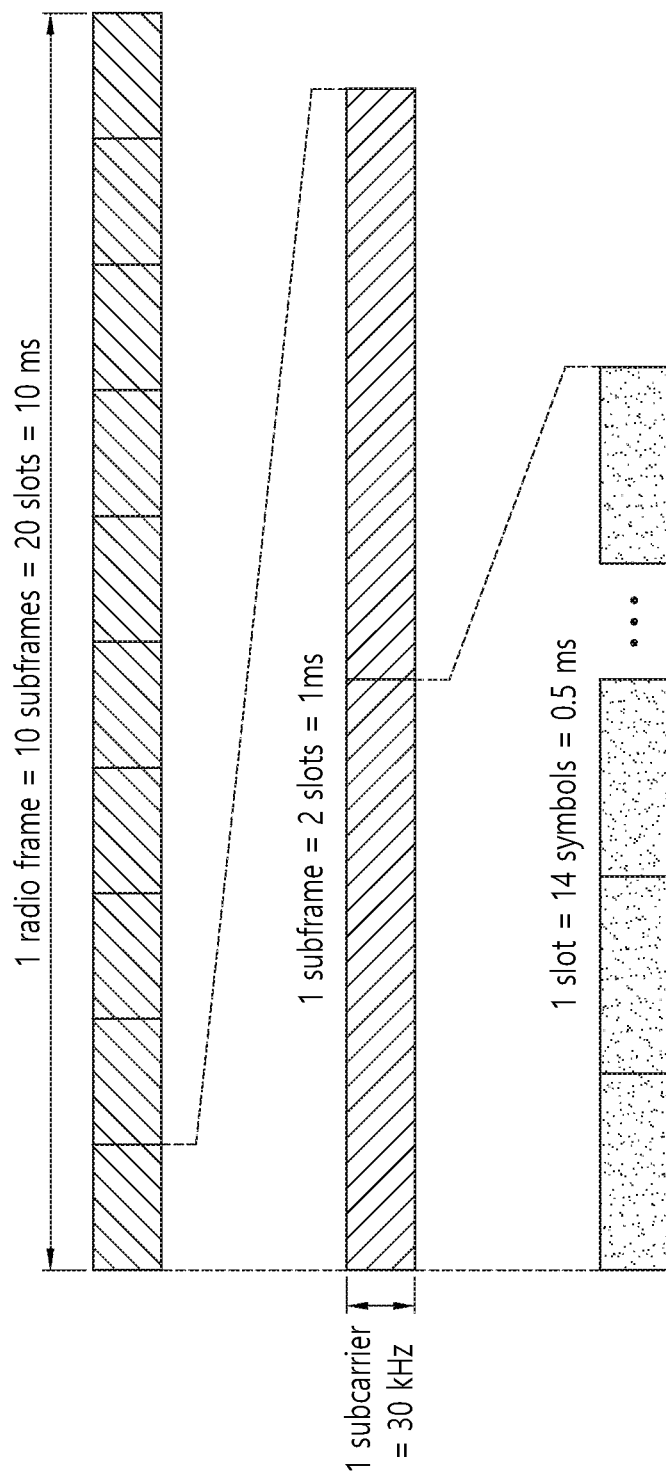
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to µ=1.

Table 3 shows an example of a number of OFDM symbols per slot, slots per radio frame, and slots per subframe for extended CP.

TABLE 3

| µ | Number of symbols per slot | Number of slots per radio frame | Number of slots per subframe |
|---|---|---|---|
| 2 | 12 | 40 | 4 |

Meanwhile, a frequency division duplex (FDD) and/or a time division duplex (TDD) may be applied to a wireless system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| For-mat | Symbol number in a slot | | | | | | | | | | | | | |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| . . . | . . . | . . . | . . . | . . . | . . . | . . . | . . . | . . . | . . . | . . . | . . . | . . . | . . . | . . . |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
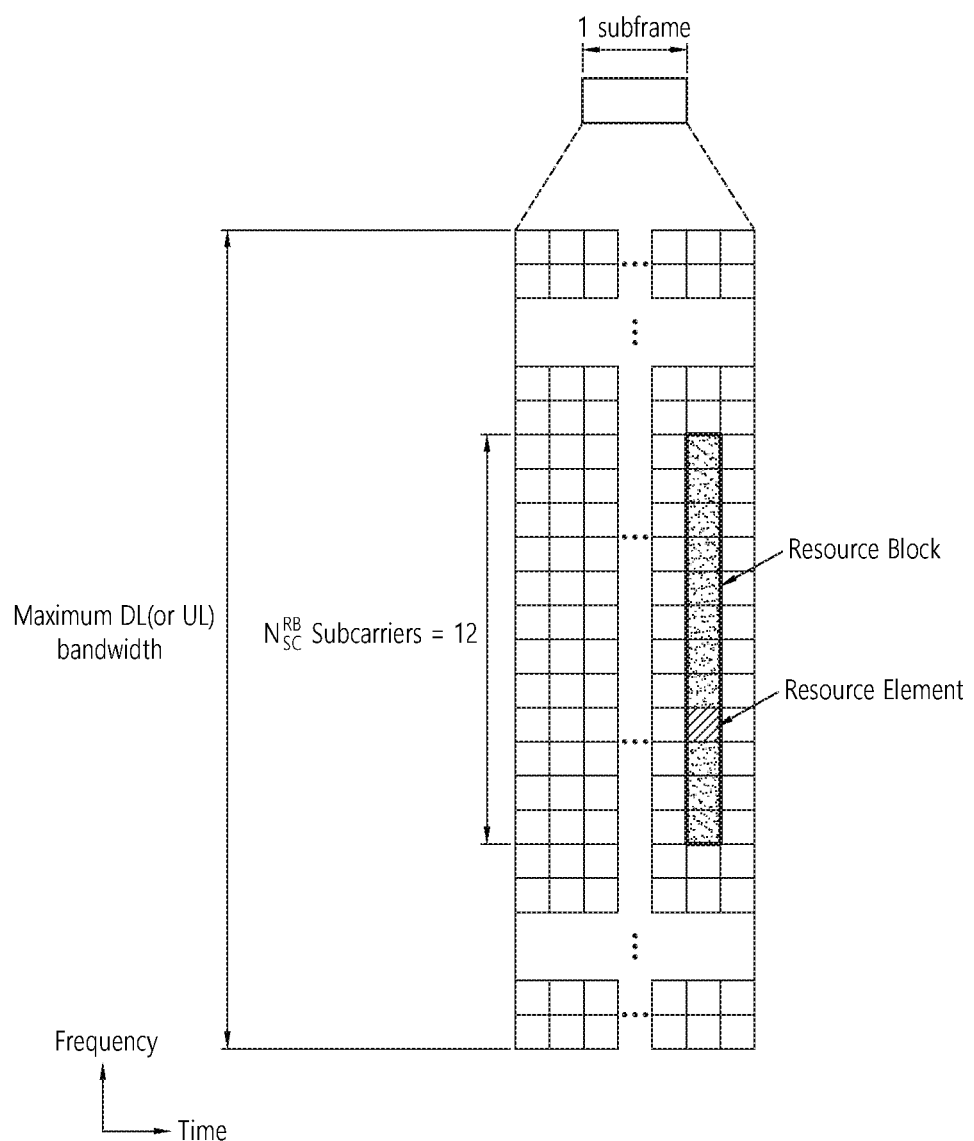
FIG. 5 shows an example of a resource grid to which technical features of the present invention can be applied.

FIG. 5 shows an example of a resource grid to which technical features of the present invention can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "µ", "14·2µ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("µ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
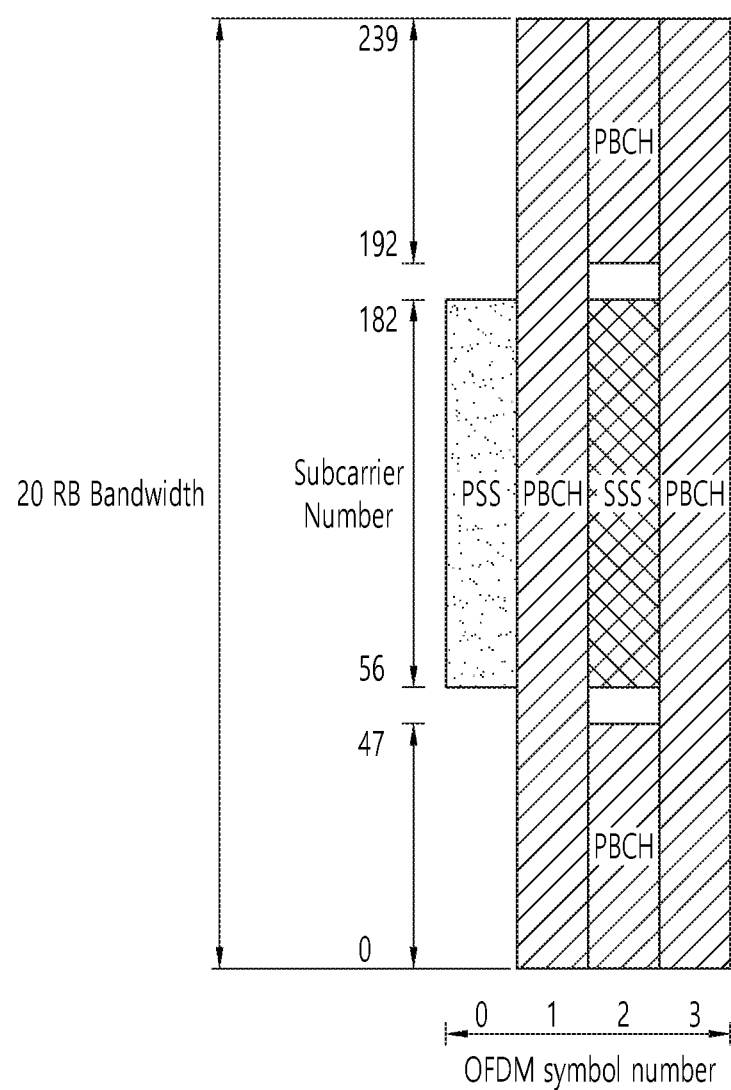
FIG. 6 shows an example of a synchronization channel to which technical features of the present invention can be applied.

FIG. 6 shows an example of a synchronization channel to which technical features of the present invention can be applied. Referring to FIG. 6, the PSS and SSS may include one symbol and 127 subcarriers. The PBCH may include 3 symbols and 240 subcarriers.

The PSS is used for synchronization signal/PBCH block (SSB) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SSB block may be repeatedly transmitted according to a predetermined pattern within the 5 ms window. For example, when L SSB blocks are transmitted, all of SSB #1 through SSB #L may contain the same information, but may be transmitted through beams in different directions. That is, quasi co-located (QCL) relationship may not be applied to the SSB blocks within the 5 ms window. The beams used to receive the SSB block may be used in subsequent operations between the UE and the network (e.g. random access operations). The SSB block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SSB index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the COREST may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BPWs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
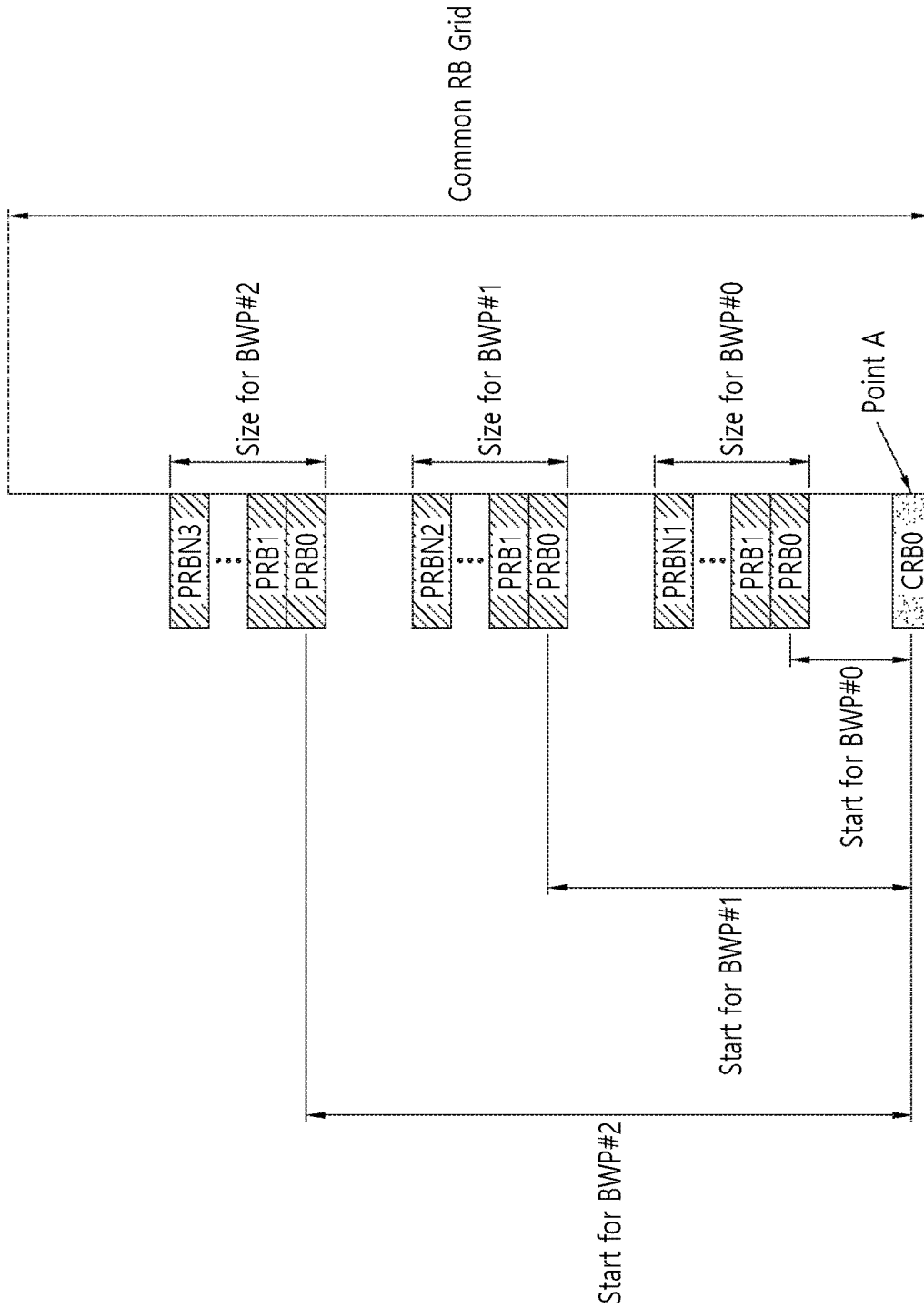
FIG. 7 shows an example of a frequency allocation scheme to which technical features of the present invention can be applied.

FIG. 7 shows an example of a frequency allocation scheme to which technical features of the present invention can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
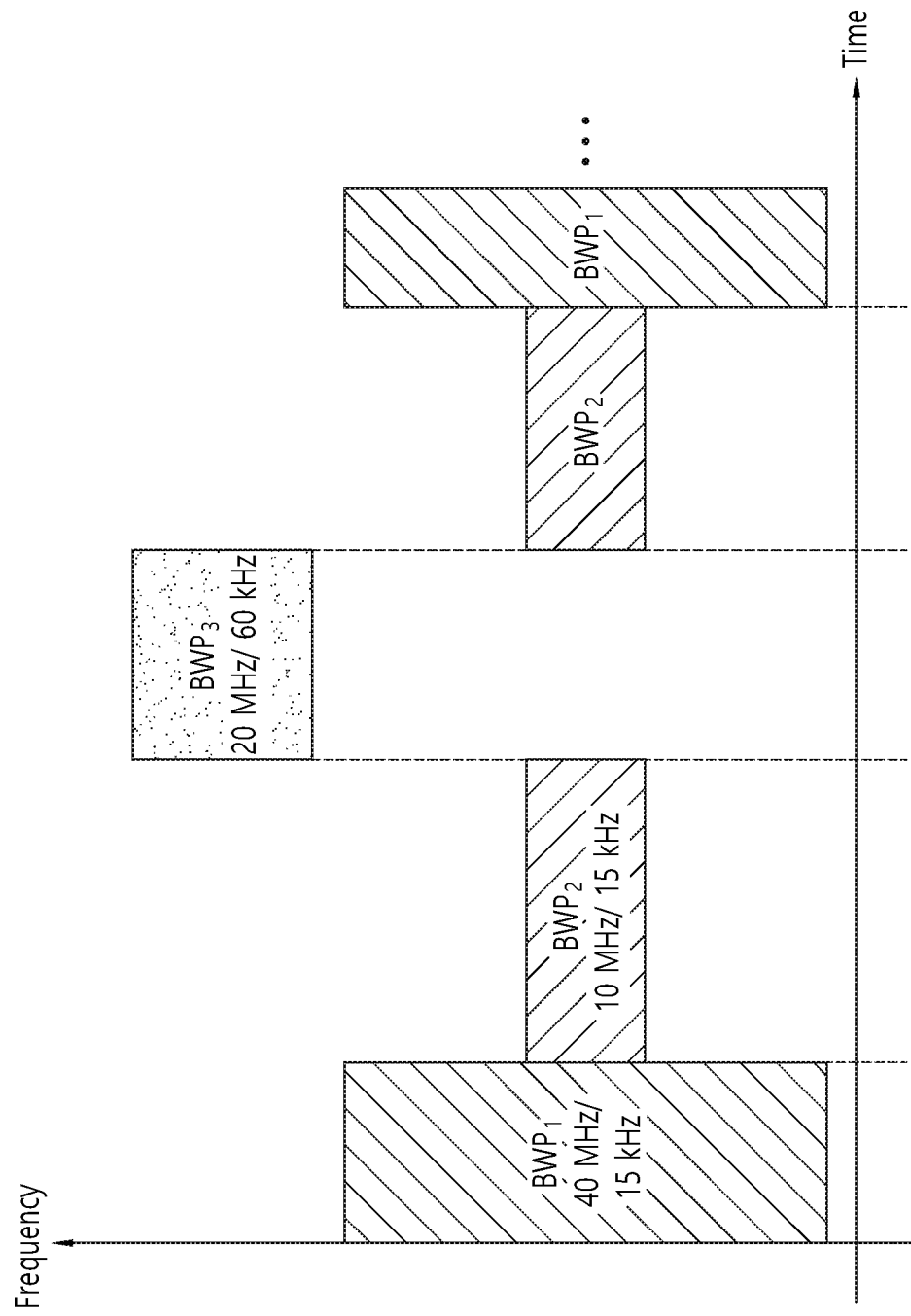
FIG. 8 shows an example of multiple BWPs to which technical features of the present invention can be applied.

FIG. 8 shows an example of multiple BWPs to which technical features of the present invention can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

1. Pre-Configuration Based PUSCH Latency Reduction

Figure 9:
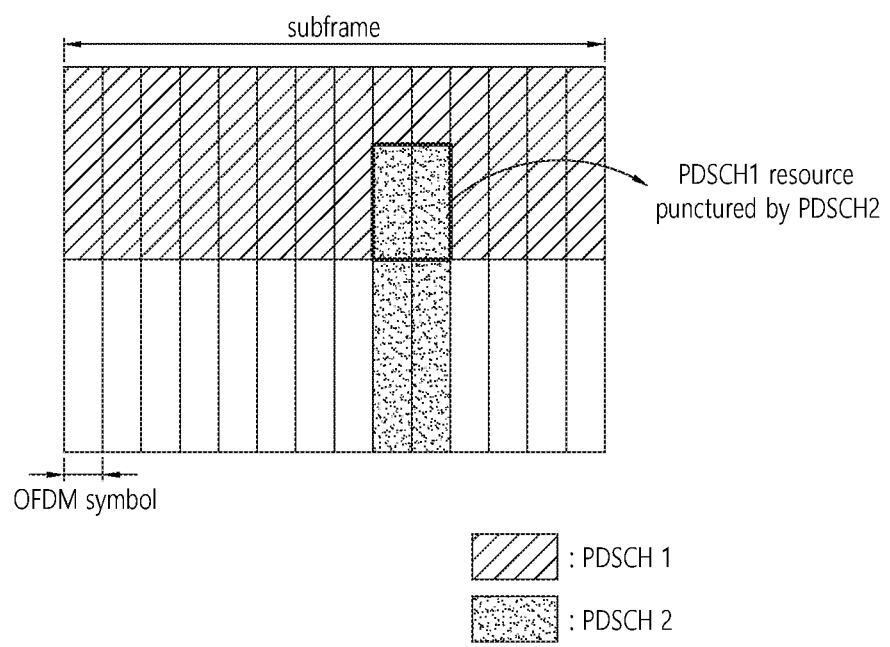
FIG. 9 shows an example of transmission of two data with different latency requirement.

FIG. 9 shows an example of transmission of two data with different latency requirement. Data with higher importance of latency (e.g. ultra-reliable low-latency communication (URLLC) data) and data with relatively lower importance of latency (e.g. enhanced mobile broadband (eMBB) data) may be multiplexed and transmitted on the same frequency resources of the same cell. Accordingly, collision of transmission resources between two data may occur. Since transmission of data in which latency is important is prioritized generally, referring to FIG. 9, the data with higher importance of latency (PDSCH 2) may be transmitted by puncturing resources for the data with lower importance of latency (PDSCH 1). In this case, the data with lower importance of latency (PDSCH 1) is generally transmitted with a longer TTI length than the data with higher importance of latency (PDSCH 2), so that some OFDM symbols of the data with lower importance of latency (PDSCH 1) is punctured for transmission of the data with higher importance of latency (PDSCH 2).

In the above case, data of which some resource is punctured experiences interference in the corresponding resource, resulting in a large performance degradation. Therefore, there is need to improve the reception performance of punctured data for other data transmission.

Additionally, when the network operates in half-duplex (i.e. perform only DL or UL at a time), it is necessary to consider how to support multiplexing of URLLC UL and eMBB DL (or, URLLC UL and eMBB DL). Also, to reduce the latency, it is necessary to consider that a UE can initiate UL transmission, at least for the first transmission which needs otherwise scheduling request (SR) transmission in a pre-configured resource with contention based approach. In other words, it is necessary to consider that the network may configure some resources in advance so that the UE can start UL transmission in such resources without receiving UL grant in prior.

To address the problem describe above, hereinafter, the present invention proposes a method for reducing PUSCH latency based on a pre-configuration according to embodiments of the present invention. In the description below, for convenience, a channel through which DL data is transmitted is referred to as a PDSCH, and a channel through which UL data is transmitted is referred to as a PUSCH. Furthermore, the present invention are mainly described in DL environment (PDSCH transmission), but it is obvious that the present invention can also be applied to UL environment (PUSCH transmission).

(1) Grant-Free Pool with Contention+Sensing Based Contention

This approach corresponds to combination of pre-scheduled PUSCH (contention resource) and listen-before-talk (LBT). The motivation of this approach is to prevent collision of pre-scheduled PUSCH resource. Accordingly, sensing may be performed before transmission (i.e. sensing on resource selected by itself).

Specifically, each sensing parameter, such as backoff window, minimum sensing, sensing threshold, etc., may be configured differently according to latency requirement. Or, each sensing parameter may be selected by the UE differently according to latency requirement. Or, each sensing parameter may be configured according to the periodicity of the grant-free resource which is allocated to the UE. For example, sensing may be performed with relatively short interval for the UE to which the grant-free resource is allocated in every symbol. On the other hand, sensing may be performed with relatively long interval for the UE to which the grant-free resource is allocated in every slot. If the periodicity of the grant-free resource are configured differently for two UEs with the same latency requirement, the UE with the long periodicity may get a priority over the UE with the short periodicity. In this case, the sensing parameters may be configured with the configuration of the grant-free resource. In addition, the sensing parameters may be configured differently for initial transmission and retransmission/repetition, respectively. That is, separate sensing parameters may be configured for initial transmission and retransmission/repetition, respectively.

Furthermore, the sensing parameters may be configured differently for clean resource and dirty resource, respectively. For the clean resource, the network has not scheduled the corresponding resource to anyone or the network has not received any request to utilize the corresponding resource which can collide. For the dirty resource, the network may schedule the corresponding resource to anyone or the network may receive any request to utilize the corresponding resource which can collide. That is, the dirty resource may be shared by multiple grant-free resource allocations.

For the dirty resource, the UE may perform sensing according to the sensing parameters when the UE receives a grant. Multiple sets of the sensing parameters may be received semi-statically, and one of the sets of the sensing parameters may be configured by the network dynamically. This is to prioritize the grant-free transmission dynamically, when resources are shared dynamically between grant-based transmission and grant-free transmission. For the clean resource, the UE may skip sensing when the UE receives a grant. If the clean/dirty configuration is available for the grant-free resource, sensing may be performed similarly.

If the UE is configured with the clean/dirty resource, the UE may perform resource selection to mainly use the clean resource for initial transmission. In addition, the UE may set the transmission power differently, depending on a status of the resource, and/or depending on whether the transmission is initial transmission or retransmission, and/or depending on a selected modulation and coding scheme (MCS), and/or depending on a reference signal received power (RSRP) of the UE. For example, the UE may set the transmission power parameters used for open loop power control for each resource differently. Or, the UE may set the transmission power parameter with lower MCS for the dirty resource.

If the UE performs contention, the clean/dirty resource may be determined by the UE measurement. In this case, the UE may determine whether the resource is clean or dirty, and may select different power and/or MCS parameters for the clean/dirty resource, respectively. The different power and/or MCS parameters for the clean/dirty resource may be configured by the network.

(2) Contention-Based Access+Backup SR Triggered UL Grant

This approach corresponds to combination of concurrent transmission (not necessary at the same slot) of pre-scheduled PUSCH (contention resource) and SR. The motivation of this approach is that a UL grant for retransmission is pre-acquired via SR to compensate for the shortcomings of waiting for grant free collision. In order to increase diversity and reliability, the same data may be transmitted in the same way.

Specifically, after transmission of contention resource, UL grant may be requested via SR. The SR, which is transmitted after contention resource or grant-free transmission, may be distinguished from the conventional SR by differentiating the resource or scrambling or sequence. Upon receiving the SR from the UE, the network may determine ACK/NACK for the grant-free transmission from the UE before transmitting UL grant, and may transmit ACK/NACK with the UL grant to the UE. Upon receiving the UL grant with ACK/NACK, the UE may perform the followings actions.

In case of collision indication for contention transmission, initial transmission with the UL grant may be performed.

In case of NACK for contention transmission, retransmission with the UL grant may be performed (retransmission classification by ID used for content such as hybrid automatic repeat request (HARD) ID, new data indicator (NDI) available).

In case of ACK for contention transmission, the UL grant may be skipped or new data may be transmitted.

In case of no response to contention transmission, collision may be considered and initial transmission may be performed.

The UE may transmit the SR by using the assigned resource for SR transmission. Alternatively, the UE may transmit the SR by using the contention resource. In this case, there is need to indicate which resource corresponds to the SR. The resource for the SR transmission may be transmitted by being included in the SR. Or, the resource for the SR transmission may be transmitted together with the SR. In this case, the assigned resource for SR transmission may be used. More specifically, the resource for SR transmission may be shared between multiple UEs. But, the multiple UEs sharing the resource for SR transmission may not share resources for data transmission. Accordingly, even though the SR transmission is overlapped over the multiple UEs, data transmission and/or DM-RS transmission may not be overlapped over the multiple UEs.

(3) UL Grant Based Initial PUSCH+No Feedback/Grant Based Retransmission

This approach corresponds combination of initial transmission based on UL grant and grant-free retransmission. The motivation of this approach is that even though it may easily resemble repetition, but retransmission without grant may be performed to reduce retransmission latency. Similar method may be applied to DL. Specifically, initial transmission or retransmission may be indicated by the UL grant. Alternatively, initial transmission may be performed at n+4 subframe according to resource defined by the UL grant, first retransmission may be performed at n+6 subframe, and if ACK does not arrive at n+8, the second retransmission may be performed. Timing may be changed. (Retransmission timing<initial timing).

More generally, grants for multiple retransmissions may be transmitted within one UL grant, and timing for the multiple retransmissions may be indicated dynamically among a set of timings which is configured semi-statically. For example, a timing may correspond to consecutive multiple retransmissions. Upon receiving grants for the consecutive multiple retransmissions, the UE may perform the consecutive multiple retransmissions, instead of one retransmission, by using resources configured by the grants. For another example, a timing may be configured by occupying a gap in every K symbols or K slots, in consideration of network processing time. The UE may perform retransmission by the configuration if the UE does not receive ACK signal in the meantime. For this, timing may be configured semi-statically in advance, and may be applied dynamically depending on the network processing time or situation.

2. ACK/NACK Channel Design

In LTE/LTE-A, a physical hybrid ARQ indicator channel (PHICH) has been used to carry ACK/NACKs in response to UL transmissions. As the network has the full flexibility, it is easier to avoid any collision on PHICH by scheduling. The HARQ-ACK location of a PUSCH transmission is determined by ($N_{PHICH}^{group}$, $n_{PHICH}^{seq}$), where $N_{PHICH}^{group}$ is the PHICH group number and $n_{PHICH}^{seq}$ is the orthogonal sequence index within the group as defined by Equation 1 below.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} / N_{PHICH}^{group} \rfloor + n_{DMRS}) \bmod 2N_{SF}^{PHICH} \quad \text{[Equation 1]}$$

In Equation 1, $I_{PRB\_RA}$ is the index of the lowest PRB which is scheduled dynamically or semi-statically.

Unlike LTE/LTE-A, an ACK/NACK channel like the PHICH has not been defined in NR for various reasons. First, timing for ACK/NACK transmission is asynchronous in NR and dynamic TDD is basically supported in NR, so the ACK/NACK channel with fixed timing like the PHICH may not be appropriate in NR. Furthermore, an amount of ACK/NACK signal and/or the number of ACK/NACK signal may change significantly according to time depending on PUSCH transmission or allocated PUSCH resources, so the ACK/NACK channel with the fixed resource like the PHICH may not be appropriate in NR. For example, with different processing time, even with scheduling, the required number of ACK/NACK bits in a slot may vary if UEs with fast processing time and UEs with slow processing time are mixed. However, in case of URLLC, in order to reduce latency for ACK/NACK transmission, it may be considered to define an ACK/NACK channel which can be shared by multiple UEs.

Hereinafter, the present invention proposes a method for defining an ACK/NACK channel in NR according to an embodiment of the present invention. Overall, the following approaches may be considered for delivering HARQ-ACK.

(1) PHICH-like channel: In this case, efficient multiplexing mechanism of this channel with PDCCH structure needs to be carefully designed.

(2) PDCCH-like channel: In this case, multiple HARQ-ACK bits may be transmitted by DCI.

The present invention focuses on (1) PHICH-like channel. The main motivation is to allow efficient multiplexing of control channel for DCI and ACK/NACK transmission. As there may be different number of ACK/NACK bits per each control channel transmission or slot, it is necessary to define a mechanism which can dynamically allocate the resource for ACK/NACK transmission efficiently. In other words, if there is no ACK/NACK bit in a slot, it is necessary not to allocate any resource for ACK/NACK transmission. Furthermore, as control channel for DCI has been designed already without considering ACK/NACK transmission, it is also necessary to efficiently multiplex ACK/NACK transmission with control channel structure such as REG and CCE. Otherwise, there may be high probability of blocking of control channel transmission if ACK/NACK transmission is present. Furthermore, the number of UEs in NR may be huge and the set of UEs expecting ACK/NACK transmission in a time may vary. In that sense, ACK/NACK transmission may need to be done based on time/frequency resource, rather than based on UE. For example, ACK/NACK resource may be determined based on time/frequency resources used for PUSCH transmission instead of assigning to each UE with ACK/NACK resource. Based on the above motivations, the followings are proposed. The following approaches may be considered for designing ACK/NACK channel like PHICH.

(1) The ACK/NACK may be mapped to one or more of REGs (2) The ACK/NACK channel may be mapped to one or more of CCEs In NR, with considering grant-free resources where many grant-free resources are configured, it is necessary to define HARQ-ACK resource for the all configured resources, as the network does not know which resources would be used for transmission. The number of resources pools which need to be identified by HARQ-ACK channel may increase as the number of potential UEs transmitting at the same time increases. In other words, HARQ-ACK number may increase as the number of resource indices increases. One resource index may be identifiable from the network reception perspective.

N number of resources may be configured by the network. The N number of resources may be differentiated by time, frequency and/or DM-RS code (or preamble codes). Reserving some resources among the N number of resources for HARQ-ACK transmission may not be efficient, particularly when N is large. Particularly, as it cannot be guaranteed that the allocated resource would be used, dedicated reservation of resource for potential ACK/NACK transmission may be very inefficient. Thus, potential resource for ACK/NACK transmission may be allocated, and the potential resource for ACK/NACK transmission may be actually allocated only if there is ACK/NACK bit(s) to transmit. The UE may blindly decode such ACK/NACK bits. This is similar to very compact DCI transmission via REG/CCE structure of CORESET. In more detail, one approach to handle this is to map HARQ-ACK resource of i-th resource index to j-th REG (or k-th CCE). If there is HARQ-ACK transmission for i-th resource index, j-th REG may be used for HARQ-ACK transmission. If there is no HARQ-ACK transmission for i-th resource index, j-th REG may be used for PDCCH transmission or other data transmission. Similarly, HARQ-ACK resource can be mapped to one CCE index. If there is HARQ-ACK transmission for i-th resource index, k-th CCE may be used for HARQ-ACK transmission. If there is no HARQ-ACK transmission for i-th resource index, k-th CCE may be used for PDCCH transmission. The mapping between i and j, or between i and k may be determined by the number of HARQ-ACK sequences in the same resource. Depending on HARQ-ACK sequence design, there may be one or multiple HARQ-ACK sequences mapped to one resource. Moreover, there may be more than one HARQ-ACK resources within one REG or CCE, and actual HARQ-ACK resource may be larger than the number of REG or CCE, even though only one sequence is mapped to the same resource.

Actual ACK/NACK transmission may be done independently per each HARQ-ACK resource. A simple mechanism is to use uplink control information (UCI) mapping mechanism (e.g. short PUCCH 1 OFDM symbol format carrying 1 or 2 bits depending on the number of transport blocks (TBs)). For example, if an ACK/NACK resource is mapped to one REG, one channel (similar to short PUCCH) may carry 1 or 2 ACK/NACK bits mapped to the resource. Different channel format may also be considered and control channel format may be used with Reed-Muller (RM) coding or simple repetition.

When HARQ-ACK index is mapped to REG index, if HARQ-ACK is transmitted, the CCE containing the REG may not be utilized for PDCCH transmission. This may increase the blocking. In other words, if HARQ-ACK index is mapped to REG index, control channel's blocking probability may increase. To mitigate this issue, the following approach may be considered.

(1) HARQ-ACK resource may be mapped only to REGs belonging to cell-specific search space (CSS). Shared RS may be transmitted in the CSS. HARQ-ACK transmission may be delivered via scrambling over the shared RS. This may increase the channel estimation complexity of UEs, as different RS scrambling may be used for CSS transmission. However, it may allow multiplexing of control channel and HARQ-ACK without additional overhead. To minimize additional complexity, it may be considered to send another DM-RS which are (semi-) orthogonal to original DM-RS.

(2) Instead of assuming that all REGs are available for HARQ-ACK transmission, only a set of REGs or a set of CCEs may be used for HARQ-ACK transmission if HARQ-ACK is transmitted via REG or CCE. Whether HARQ-ACK transmission has occurred or not may be indicated by group common PDCCH. More generally, if a set of CCEs used for HARQ-ACK transmission (if present) can be indicated via a group common PDCCH or a PDCCH (dynamically), a UE may skip decoding on such CCEs according to search space candidates. When a candidate includes such CCE(s), the UE may skip decoding on the candidate and continue to the next candidate.

If HARQ-ACK is transmitted over CSS, REGs or CCEs not potentially used for CSS candidates may be allocated for HARQ-ACK transmission. For example, if candidates are constructed from CCE 0 to CCE P (e.g. if aggregation level (AL)=8 with 2 candidates, P becomes 15), CCE P+1 to CCE Q may be used for HARQ-ACK transmission. Or, from the last CCE, m CCEs may be used for HARQ-ACK transmission, if present. The remaining resources may not be designated for HARQ-ACK transmission. It may be used for control channel mapping, for example, when physical resources of such CCEs/REGs are shared between CSS and USS.

Alternatively, REGs/CCEs used for HARQ-ACK transmission may be selected by assigning RNTI for HARQ-ACK transmission. Hashing function in the RNTI may be used to map REGs/CCEs to HARQ-ACK transmission. Or, the starting CCE index for HARQ-ACK transmission may be determined following a random function. By this way, a physical resource where HARQ-ACK transmission is mapped may be changed in every slot or mini-slot in which control channel is transmitted. This is to avoid potentially blocking other UEs by fixing the location of HARQ-ACK transmission. To support this, the aggregation level or the number of CCEs reserved/allocated for HARQ-ACK transmission may be either pre-defined or semi-statically configured or dynamically indicated (e.g. via a group common PDCCH). In other words, each UE may blindly search multiple candidates, and ACK/NACK transmission may be carried based on the configured RNTI for ACK/NACK transmission. This is to determine REG/CCE resources used for ACK/NACK transmission. The number of CCEs used for ACK/NACK transmission in each candidate may be defined based on ACK/NACK loads, either cell specifically or UE group specifically or UE specifically. REGs or CCEs mapped to the same candidate may be used for ACK/NACK transmission to multiple PUSCH resources, and only ACK/NACK resources with actual PUSCH transmission may carry ACK/NACK bits. The UE may detect ACK/NACK bits either by detecting DM-RS in a potential ACK/NACK resource or by detecting ACK/NACK bits in the potential ACK/NACK resource.

In more detail, for actual transmission of ACK/NACK channel, the following candidate mechanisms may be considered.

Zadoff-Chu (ZC) based sequence with cyclic shift (CS): This is similar to PUCCH format 1 in LTE/LTE-A.
Orthogonal sequences may be multiplexed in the same resource. This is similar to PHICH in LTE-LTE-A.

To minimize mis-detection of regular data for HARQ-ACK transmission if HARQ-ACK transmission is present optionally or depends on detection condition at the network, constellation of HARQ-ACK transmission may be different from regular PDCCH transmission. For example, 45 degree shifted constellation points may be used for HARQ-ACK transmission compared to PDCCH transmission utilizing quadrature phase shift keying (QPSK). If this is used, HARQ-ACK transmission may also be delivered with PDCCH at the same resource via superposition. However, a UE may not be able to detect PDCCH candidate which overlaps with HARQ-ACK resource for the UE.

Figure 10:
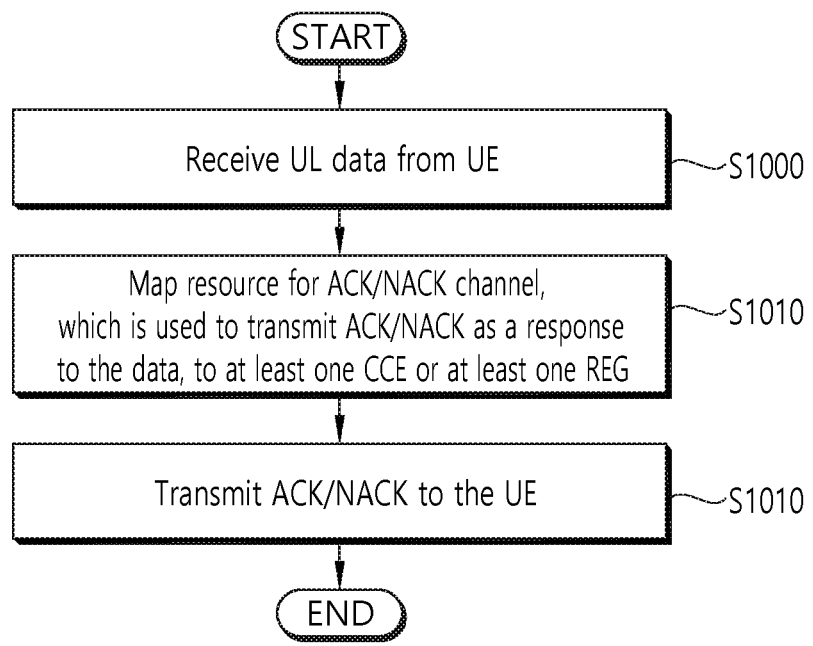
FIG. 10 shows a method for transmitting an ACK/NACK by a BS according to an embodiment of the present invention.

FIG. 10 shows a method for transmitting an ACK/NACK by a BS according to an embodiment of the present invention. The present invention describe above, specifically "2. ACK/NACK channel design", may be applied to this embodiment.

In step S1000, the BS receives UL data from a UE. In step S1010, the BS maps a resource for an ACK/NACK channel, which is used to transmit the ACK/NACK as a response to the UL data, to at least one CCE or at least one REG. In step S1020, the BS transmits the ACK/NACK to the UE. The ACK/NACK channel is multiplexed with PDCCH in the at least one CCE or the at least one REG.

The resource for the ACK/NACK channel may be at least one resource among multiple resource configured by the BS. The multiple resources may be differentiated by one of time, frequency or DM-RS code. The mapping between the resource for the ACK/NACK channel and the at least one CCE or the at least one REG may be determined based on a number of ACK/NACK sequences in a same resource. One or more ACK/NACK sequences may be mapped to the resource for the ACK/NACK channel.

The resource for the ACK/NACK channel may be mapped to the at least one REG, and the at least one REG only belongs to CSS. A shared RS may be transmitted in the CSS, and the ACK/NACK may be transmitted via scrambling over the shared RS.

Alternatively, the at least one CCE or the at least one REG may be configured among a set of CCEs or a set of REGs used for ACK/NACK transmission. Whether the ACK/NACK transmission has occurred or not may be indicated by a group common PDCCH. The set of CCEs or the set of REGs used for the ACK/NACK transmission may correspond to CCEs or REGs not used for CSS candidates. Or, the set of CCEs or the set of REGs used for the ACK/NACK transmission may be configured by a RNTI. Mapping between the set of CCEs or the set of REGs used for the ACK/NACK transmission and the resource for the ACK/NACK channel may be indicated by a hashing function in the RNTI.

The ACK/NACK may be transmitted by using a ZC based sequence with CS. Furthermore, a constellation of the ACK/NACK may be different from a constellation of the PDCCH or other data.

Figure 11:
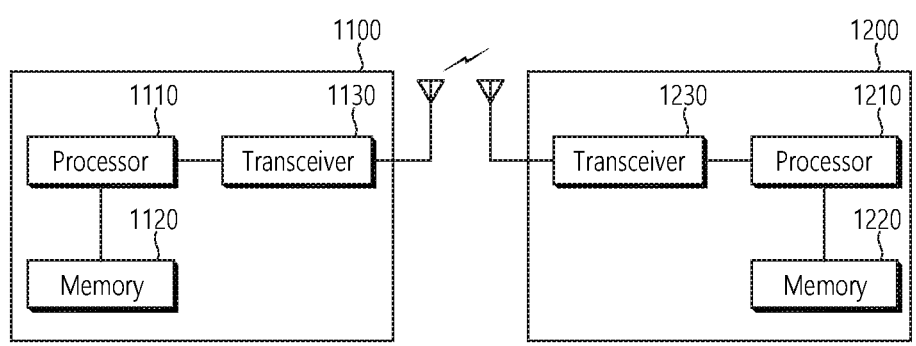
FIG. 11 shows a wireless communication system to implement an embodiment of the present invention.

FIG. 11 shows a wireless communication system to implement an embodiment of the present invention.

A UE 1100 includes a processor 1110, a memory 1120 and a transceiver 1130. The processor 1110 may be configured to implement proposed functions, procedures and/or methods described in this description. Layers of the radio interface protocol may be implemented in the processor 1110. The memory 1120 is operatively coupled with the processor 1110 and stores a variety of information to operate the processor 1110. The transceiver 1120 is operatively coupled with the processor 1110, and transmits and/or receives a radio signal.

A network node 1200 includes a processor 1210, a memory 1220 and a transceiver 1230. The processor 1210 may be configured to implement proposed functions, procedures and/or methods described in this description. Layers of the radio interface protocol may be implemented in the processor 1210. The memory 1220 is operatively coupled with the processor 1210 and stores a variety of information to operate the processor 1210. The transceiver 1230 is operatively coupled with the processor 1210, and transmits and/or receives a radio signal.

The processors 1110, 1210 may include application-specific integrated circuit (ASIC), other chipset, logic circuit and/or data processing device. The memories 1120, 1220 may include read-only memory (ROM), random access memory (RAM), flash memory, memory card, storage medium and/or other storage device. The transceivers 1120, 1230 may include baseband circuitry to process radio frequency signals. When the embodiments are implemented in software, the techniques described herein can be implemented with modules (e.g., procedures, functions, and so on) that perform the functions described herein. The modules can be stored in memories 1120, 1220 and executed by processors 1110, 1210. The memories 1120, 1220 can be implemented within the processors 1110, 1210 or external to the processors 1110, 1210 in which case those can be communicatively coupled to the processors 1110, 1210 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for transmitting an acknowledgement/non-acknowledgement (ACK/NACK) by a base station (BS) in a wireless communication system, the method comprising:
   receiving uplink (UL) data from a user equipment (UE); and
   transmitting, to the UE via an ACK/NACK channel, the ACK/NACK as a response to the UL data,
   wherein the ACK/NACK channel is mapped to at least one control channel element (CCE), and
   wherein the at least one CCE to which the ACK/NACK channel is mapped is used for physical downlink control channel (PDCCH) candidates in a search space for decoding a PDCCH based on that:
   (i) the PDCCH is modulated by a quadrature phase shift keying (QPSK); and
   (ii) the ACK/NACK is modulated by the QPSK with a phase shifted by 45 degrees.

2. The method of claim 1, wherein the ACK/NACK channel is at least one resource among multiple resources configured by the BS.

3. The method of claim 2, wherein the multiple resources are differentiated by one of time, frequency or demodulation reference signal (DM-RS) code.

4. The method of claim 1, wherein a mapping relationship between the ACK/NACK channel and the at least one CCE is determined based on a number of ACK/NACK sequences in a same resource.

5. The method of claim 1, wherein one or more ACK/NACK sequences are mapped to the ACK/NACK channel.

6. The method of claim 1, wherein the at least one CCE is configured among a set of CCEs used for an ACK/NACK transmission.

7. The method of claim 6, wherein whether the ACK/NACK transmission has occurred or not is indicated by a group common PDCCH.

8. The method of claim 6, wherein the set of CCEs used for the ACK/NACK transmission is configured by a radio network temporary identity (RNTI).

9. The method of claim 8, wherein a mapping between the set of CCEs for the ACK/NACK transmission and the ACK/NACK channel is indicated by a hashing function in the RNTI.

10. The method of claim 1, wherein the ACK/NACK is transmitted by using a Zadoff-Chu (ZC) based sequence with a cyclic shift (CS).

11. A base station (BS) configured to operate in a wireless communication system, the BS comprising:
    a memory;
    a transceiver; and
    at least one processor, operably coupled to the memory and the transceiver, configured to:
    control the transceiver to receive uplink (UL) data from a user equipment (UE); and
    control the transceiver to transmit, to the UE via an ACK/NACK channel, the ACK/NACK as a response to the UL data,
    wherein the ACK/NACK channel is mapped to at least one control channel element (CCE), and
    wherein the at least one CCE to which the ACK/NACK channel is mapped is used for physical downlink control channel (PDCCH) candidates in a search space for decoding a PDCCH based on that:
    (i) the PDCCH is modulated by a quadrature phase shift keying (QPSK); and
    (ii) the ACK/NACK is modulated by the QPSK with a phase shifted by 45 degrees.

12. The method of claim 1, wherein the UE is in communication with at least one of a mobile device, a network, or autonomous vehicles other than the UE.

* * * * *